(12) United States Patent
De Araujo et al.

(10) Patent No.: US 10,402,009 B2
(45) Date of Patent: *Sep. 3, 2019

(54) SYSTEM AND METHOD FOR TIMING INPUT SENSING, RENDERING, AND DISPLAY TO MINIMIZE LATENCY

(71) Applicant: Tactual Labs Co., New York, NY (US)

(72) Inventors: Bruno Rodrigues De Araujo, Toronto (CA); Clifton Forlines, South Portland, ME (US); Ricardo Jorge Jota Costa, Toronto (CA)

(73) Assignee: Tactual Labs Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,915

(22) Filed: May 14, 2018

(65) Prior Publication Data
US 2018/0260074 A1    Sep. 13, 2018

Related U.S. Application Data

(63) Continuation of application No. 14/945,083, filed on Nov. 18, 2015, now Pat. No. 9,971,443.
(Continued)

(51) Int. Cl.
*G06F 3/041*    (2006.01)
*G09G 5/395*    (2006.01)

(52) U.S. Cl.
CPC ........... *G06F 3/0416* (2013.01); *G09G 5/395* (2013.01); *G09G 2310/08* (2013.01); *G09G 2354/00* (2013.01); *G09G 2360/18* (2013.01)

(58) Field of Classification Search
None
See application file for complete search history.

(56) References Cited

U.S. PATENT DOCUMENTS 9,971,443 B2 *    5/2018    Rodrigues De Araujo .................
                                                G06F 3/0416
2013/0222302 A1    8/2013    Savard
(Continued)

*Primary Examiner* — Joseph R Haley
*Assistant Examiner* — Emily J Frank
(74) *Attorney, Agent, or Firm* — Adam Landa

(57) ABSTRACT

Disclosed are systems and methods for decreasing latency between an acquisition of touch data and processing of an associated rendering task in a touch sensitive device having a touch sensing system capable of producing touch data at a touch sampling rate and having a display system that displays frames at a refresh rate. In an embodiment, the system estimates at least one of (a) a period of time for sampling touch data from the touch sensing system, (b) a period of time for computing touch event data from sampled touch data, and (c) a period of time for rendering of a frame to a frame buffer. The system determines a period of time Tc for (a) sampling touch data from the touch sensing system, (b) computing touch event data from sampled touch data, and (c) rendering of a frame to a frame buffer, based at least in part on the estimate. The system determines a point in time Tr at which the display system will be refreshed from the frame buffer. A sampling start time is computed based at least in part upon Tr and Tc. Sampling of the touch sensing system is initiated to obtain sampled touch data at the sampling start time. Touch event data is computed from the sampled touch data, and a frame that reflects the touch event data is rendered to the frame buffer prior to the time Tr. The display is then refreshed from the frame buffer.

20 Claims, 4 Drawing Sheets

RENDER FASTER WITH
MORE TIMELY INFORMATION

Related U.S. Application Data

(60) Provisional application No. 62/081,261, filed on Nov. 18, 2014.

(56) References Cited

U.S. PATENT DOCUMENTS

| | | |
|---|---|---|
| 2013/0271487 A1 | 10/2013 | Lincoln |
| 2014/0062899 A1 | 3/2014 | Lee et al. |
| 2014/0071062 A1 | 3/2014 | Fang |
| 2014/0092150 A1* | 4/2014 | Slavenburg ............ G09G 5/001 345/698 |
| 2014/0198052 A1* | 7/2014 | Tokutake ................ G06F 3/041 345/173 |
| 2014/0204036 A1 | 7/2014 | Schillings et al. |
| 2014/0218323 A1 | 8/2014 | Hung et al. |
| 2014/0292677 A1 | 10/2014 | Yamamoto et al. |

\* cited by examiner

SYSTEM AND METHOD FOR TIMING INPUT SENSING, RENDERING, AND DISPLAY TO MINIMIZE LATENCY

This application is a continuation of U.S. patent application Ser. No. 14/945,083, filed Nov. 18, 2015, entitled "System and Method for Timing Input Sensing, Rendering, and Display to Minimize Latency" which in turn is a non-provisional of and claims priority to U.S. Patent Application No. 62/081,261, filed Nov. 18, 2014, the entire disclosure of which is incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
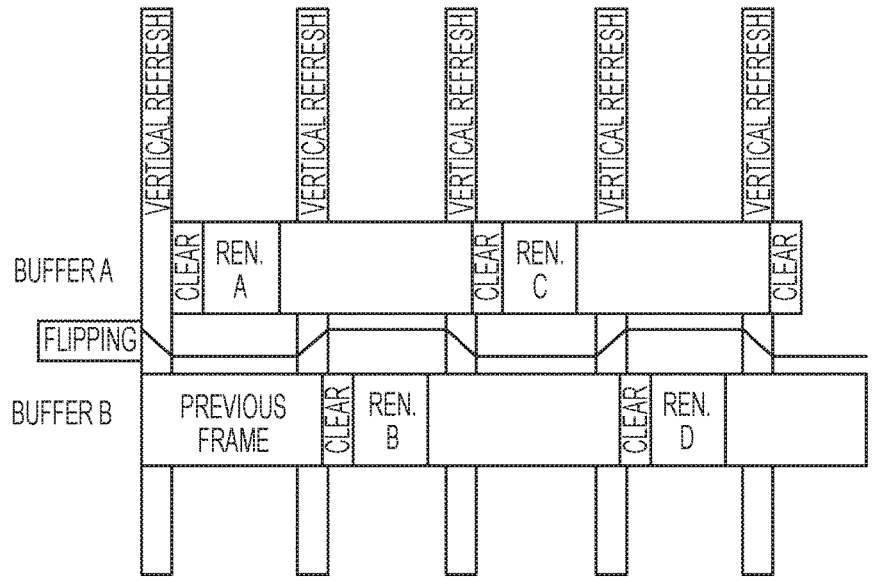
FIG. 1 shows a diagram illustrating a prior double-buffered solution.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for timing input sensing, rendering and display to minimize latency. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Interactive devices can be seen as a composition of multiple parts, including input sensory, processing and rendering tasks, and output display. The pipeline required to convert input sensory (e.g.: finger touch) into a visual response is not immediate; each action introduces latency for numerous reasons, such as time required to process information or, in the case of displays, frequency that the display uses to redraw its entire screen, or parts of thereof. As such, even if these actions work in parallel, when possible, a system is only as fast as the slowest of the actions. For example, displays may only refresh once every 60 Hz, which means that, if everything else is faster (or available) before the next refresh cycle, the system is forced to wait for the display to be ready to display the new information.

It is an object of the present invention to reduce the latency (that is, the time between the user's input to the system and the system's graphical response to that input). It is also an object to enable the most recent input information to be displayed, by synchronizing the input capture and processing with the display refresh. Currently, any input information is processed as soon as possible and often is left waiting for the next refresh cycle. This alone introduces a wait period and is reflected in the overall system latency. In accordance with an embodiment of the presently disclosed methods, the system considers when the next refresh will be and takes that into account to provide the most up-to-date events, just in time for rendering.

In an embodiment, the time to refresh the display and the time required to sample the input sensor and compute the touch point are known. Thus, the input sensing is delayed to coincide to end when the refresh is about to start. In an embodiment, the rendering is started at the last possible moment so that it completes and the output is ready for the next display refresh. This just-in-time rendering will have access to the most recent input events; thus, the resulting display will include graphics with minimum amounts of latency.

In another embodiment, the time to refresh or the time to sample the input sensor are not known a priori and require measurements. Measurements are executed based on key timestamps, and this allows us to ensure temporal ordering and sequencing. Through measuring, the input sample rate and display refresh rate become known, and the rendering of the graphics can be timed as outlined above in order to minimize latency.

In another embodiment such measurements are detected using external measure paraphernalia and user-input (or defined as constants).

In another embodiment, these measures vary according to system workload and measures are not precise, but mere attempts to reduce the wait for the display. The time required to render the output is a function of the complexity of the output and competing system activities (more complex outputs generally require more time to render, competing activities on the CPU or GPU can slow down rendering, and so on). In this embodiment, the system estimates the rendering time based on some combination of: models of the output complexity; knowledge of competing activities on key system components; the time required to render previous frames; and, the time required to render similar outputs in the past.

In another embodiment, the system renders the output as soon as the display completes its vertical refresh and the appropriate buffer is available to render into. After rendering is complete, and until the next vertical refresh, the system updates this rendering based on additional input event samples by the input sensor. For example, the system might render a view of a GUI and then translate it based on additional input events until such a time as the rendering must be displayed.

FIG. 1 shows a prior double-buffered solution. In such a solution, the display "flips" or "swaps" between two buffers which are used for display and rendering (A & B). When Buffer A is visible, the device renders into Buffer B. At a predetermined rate, the system flips/swaps the buffers so that B is now visible and A can be rendered into. When a Buffer is offscreen, it is cleared and rendered into.

Figure 2:
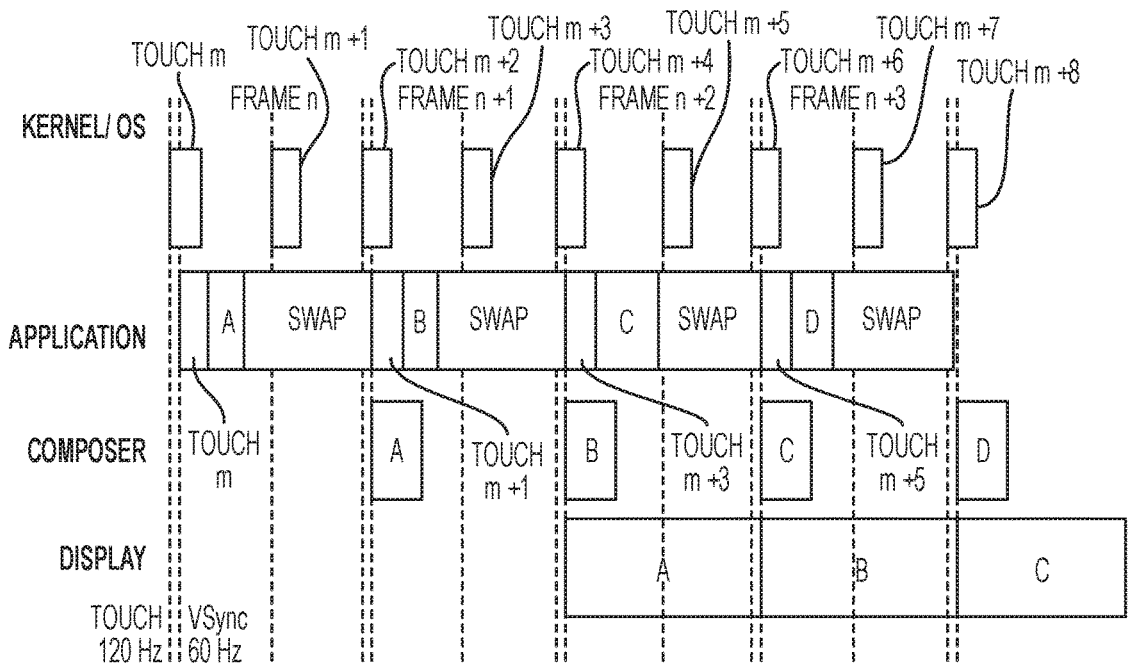
FIGS. 2 and 3 show diagrams illustrating prior methods of rendering.
Figure 3:
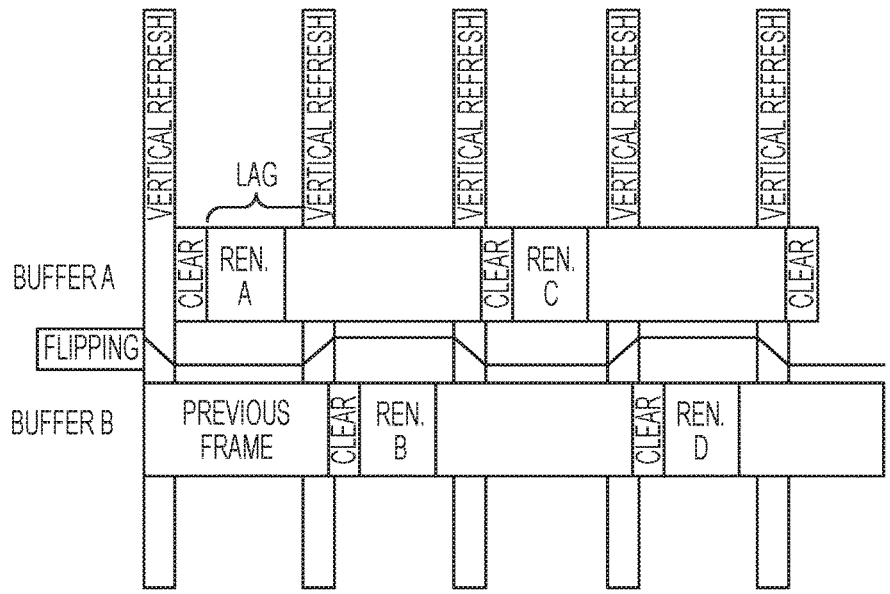

FIGS. 2 and 3 show a prior method of rendering. The GUI is rendered using the most recent input data and application state. Latency (lag) occurs when there is a difference between the application state (including input) when the GUI is rendered and when it is finally displayed on screen. In FIG. 3, the lag of rendering A is shown as the time between the start of rendering A and the vertical refresh that displays the result of rendering A on the screen.

Figure 4:
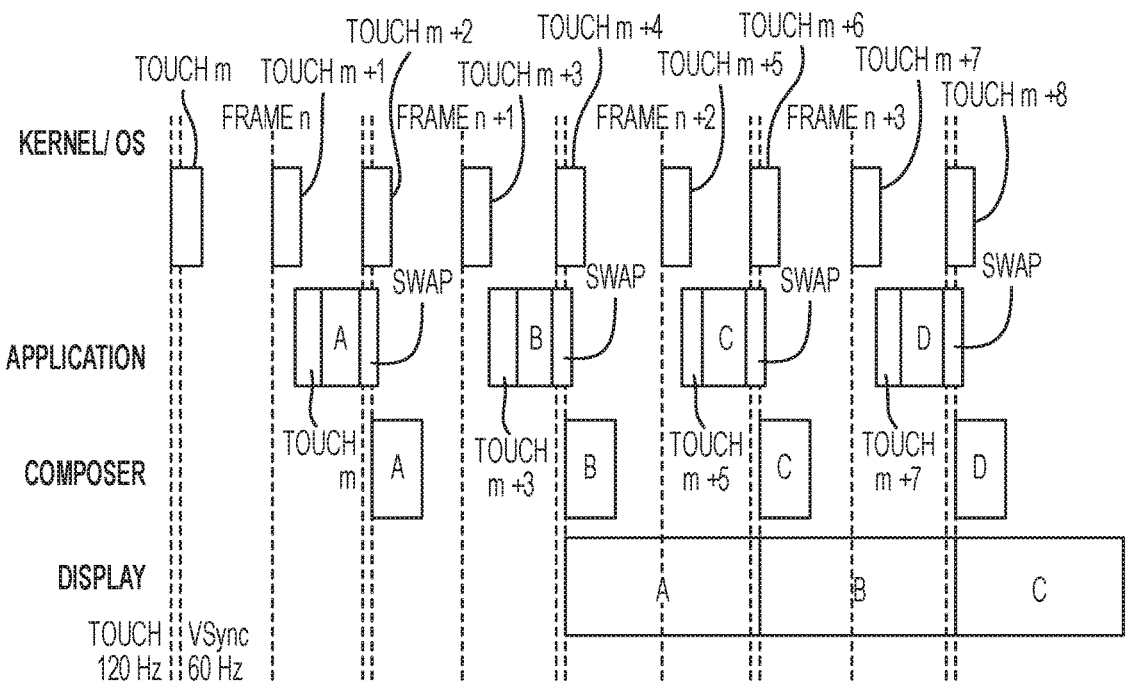
FIGS. 4 and 5 show diagrams illustrating embodiments of a solution to reduce lag by rendering faster and refreshing the screen faster.
Figure 5:
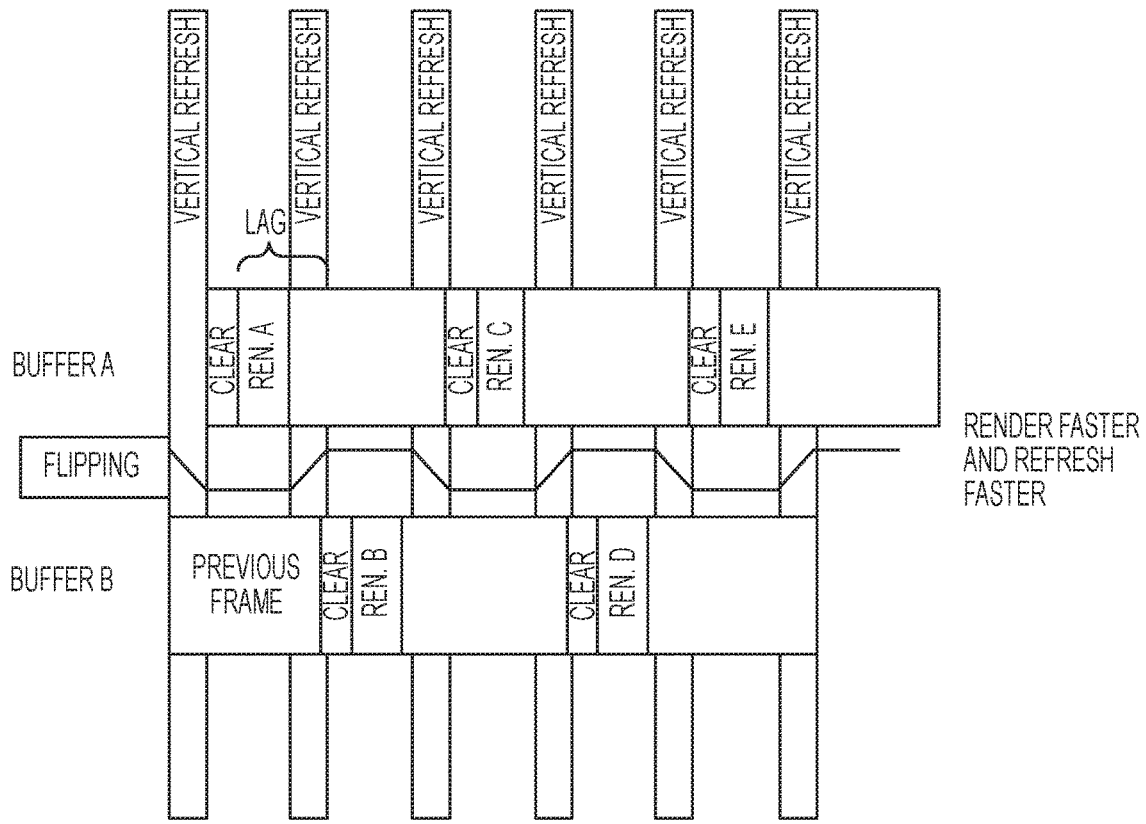

FIGS. 4 and 5 show embodiments of a solution to reduce lag by rendering faster and refreshing the screen faster. For example, one might include a faster GPU in their system or other such improvements, and may run their display at a faster refresh rate (say 100 Hz rather than 60 Hz). In this manner, the rendered graphics are both created faster and display faster on-screen to the user, thus reducing the time between the start of rendering and the display of the GUI to the user. As long as there is time to clear the buffer and render the GUI between vertical refreshes of the screen, this approach will reduce lag at the expense of more capable rendering engines and faster more expensive displays.

Figure 6:
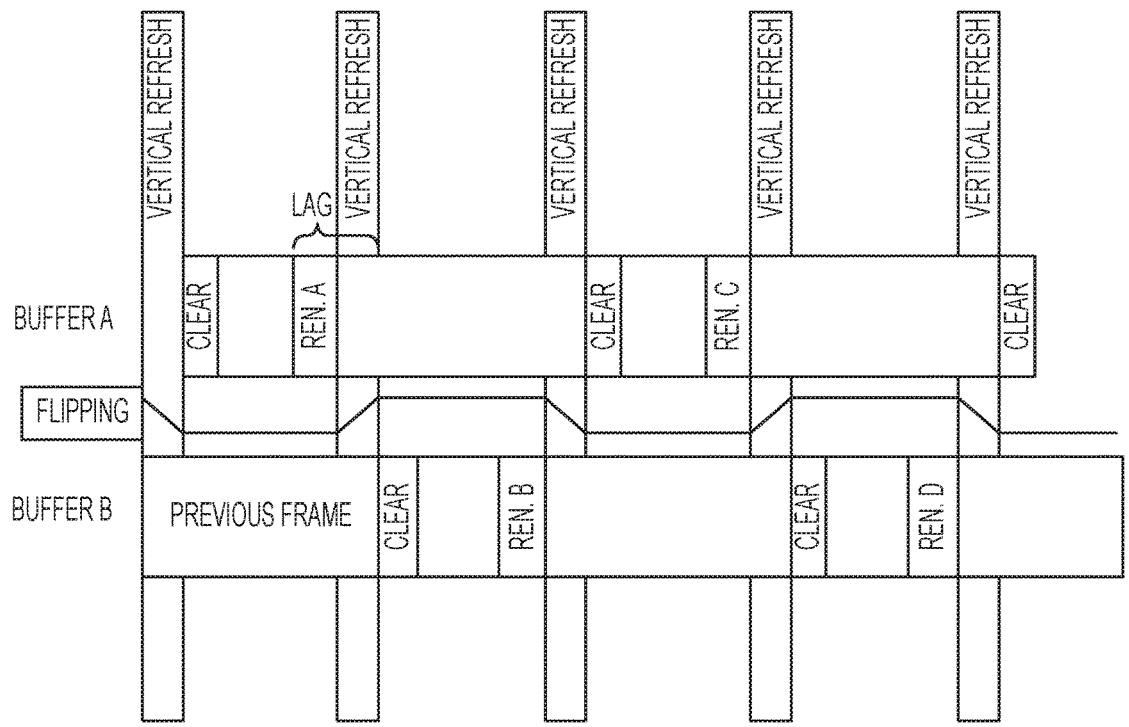
FIG. 6 shows a diagram illustrating an embodiment of the presently disclosed system and method in which a system is provided that times the rendering of the GUI.

FIG. 6 shows an embodiment of the disclosed system and method wherein the rendering of the GUI is timed so that it finishes as close to the vertical refresh as possible. In this manner, the rendering can use the most recently available input from the user and most recently available application state to produce the rendered image, thus reducing lag.

In an embodiment, a system and method are provided for decreasing latency between an acquisition of touch data and processing of an associated rendering task in a touch sensitive device having a touch sensing system capable of producing touch data at a touch sampling rate and having a display system that displays frames at a refresh rate. The system estimates at least one of (a) a period of time for sampling touch data from the touch sensing system, (b) a period of time for computing touch event data from sampled touch data, and (c) a period of time for rendering of a frame to a frame buffer. The system determines a period of time Tc for (a) sampling touch data from the touch sensing system, (b) computing touch event data from sampled touch data, and (c) rendering of a frame to a frame buffer, based at least in part on the estimate. The system determines a point in time Tr at which the display system will be refreshed from the frame buffer. A sampling start time is computed based at least in part upon Tr and Tc. Sampling of the touch sensing system is initiated to obtain sampled touch data at the sampling start time. Touch event data is computed from the sampled touch data, and a frame that reflects the touch event data is rendered to the frame buffer prior to the time Tr. The display is then refreshed from the frame buffer.

In an embodiment, the system determines a period of time Tc required to compute touch event data from sampled touch data and render a frame to a frame buffer and a point in time Tr at which the display system will be refreshed from the frame buffer. The touch sensing system is sampled to create sampled touch data. Touch event data is computed from the sampled touch data, and the beginning of this computing step is delayed to occur at a point in time that is at least as early as (Tr-Tc). A frame is rendered to the frame buffer prior to the point in time Tr, and the display system is then refreshed from the frame buffer.

In an embodiment, a method is provided for decreasing latency between an acquisition of touch data and processing of an associated rendering task in a touch sensitive device having (a) a touch sensing system capable of producing touch data a touch sampling rate and having a sampling sync, and (b) a display system that displays frames at a refresh rate having a refresh sync. Sampling of touch sensor output is commenced on a sampling sync and sampled output is placed in a sampling buffer at a sampling rate. Frame rendering to one of a plurality of display buffers is commenced on a refresh sync, and display images corresponding to a rendered frame are displayed on a refresh sync. A period of time Tc corresponding to an estimated time for collecting the output in the sampling buffer is determined, a period of time Tm corresponding to an estimated time for computing touch event data from collected output is determined, and a period of time Tr corresponding to an estimated time for rendering of a frame corresponding to the touch event data is determined. A start time is computed based upon the refresh sync, Tc, Tm and Tr, and collecting of the output in the sampling buffer is initiated at the start time. Thereafter, touch event data is computed from collected output and a frame corresponding to the touch event data is rendered.

Throughout this disclosure, the terms "touch", "touches," or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch"

when used as a noun include a near touch and a near touch event, or any other gesture that can be identified using a sensor.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. A method for decreasing latency between an acquisition of touch data and processing of an associated rendering task in a touch sensitive device having a touch sensing system capable of producing touch data at a touch sampling rate and having a display system that displays frames at a refresh rate, the frames reflecting input to the touch sensing system, the method comprising:
   estimating at least one of (a) a period of time for sampling touch data from the touch sensing system, (b) a period of time for computing touch event data from sampled touch data, and (c) a period of time for rendering of a frame to a frame buffer;
   determining a period of time Tc for (a) sampling touch data from the touch sensing system, (b) computing touch event data from sampled touch data, and (c) rendering of a frame to a frame buffer, based at least in part on the estimate;
   determining a point in time Tr at which the display system will be refreshed from the frame buffer;
   computing a sampling start time based at least in part upon Tr and Tc;
   initiating sampling of the touch sensing system to obtain sampled touch data at the sampling start time;
   computing touch event data from the sampled touch data; and
   rendering a frame reflecting the touch event data to the frame buffer prior to the time Tr.

2. The method of claim 1, wherein the step of determining a period of time comprises measuring at least one of: (a) the period of time for sampling touch data from the touch sensing system, (b) the period of time for computing touch event data from sampled touch data, and (c) the period of time for rendering of a frame to the frame buffer.

3. The method of claim 1, wherein the step of determining a period of time comprises measuring a period of time previously required for sampling touch data from the touch sensing system, computing touch event data from sampled touch data, and rendering a previous frame to the frame buffer.

4. The method of claim 1, wherein the step of determining a period of time comprises measuring the refresh rate of the display system.

5. The method of claim 1, wherein the step of determining the point in time Tr is performed utilizing a timestamp and the refresh rate.

6. The method of claim 1, wherein the period of time for rendering of a frame to a frame buffer comprises a period of time for completion of rendering of the frame and writing data for the frame to the frame buffer.

7. The method of claim 1, wherein commencement of rendering is delayed until a time which allows rendering to be completed and the rendered output ready in a predetermined period of time prior to the display system refresh.

8. A method for decreasing latency between an acquisition of touch data and processing of an associated rendering task in a touch sensitive device having a touch sensing system capable of producing touch data at a touch sampling rate and a display system that displays frames at a refresh rate, the frames reflecting input to the touch sensing system, the method comprising:
determining a period of time Tc required to compute touch event data from sampled touch data and render a frame to a frame buffer;
determining a point in time Tr at which the display system will be refreshed from the frame buffer;
sampling the touch sensing system to create sampled touch data;
computing touch event data from the sampled touch data, the beginning of the computing step being delayed to occur at a point in time that is at least as early as (Tr-Tc); and
rendering a frame to the frame buffer prior to the point in time Tr.

9. The method of claim 8, wherein the step of determining a period of time comprises measuring a period of time previously required for computing touch event data from sampled touch data.

10. The method of claim 8, wherein the step of determining a period of time comprises measuring the refresh rate of the display system.

11. The method of claim 8, wherein the step of determining the point in time Tr is performed utilizing a timestamp and the refresh rate.

12. The method of claim 8, wherein the period of time for rendering of a frame to a frame buffer comprises a period of time for completion of rendering of the frame and writing data for the frame to the frame buffer.

13. The method of claim 8, wherein commencement of rendering is delayed until a time which allows rendering to be completed and the rendered output ready in a predetermined period of time prior to the display system refresh.

14. A method for decreasing latency between an acquisition of touch data and processing of an associated rendering task in a touch sensitive device having
(a) a touch sensing system capable of producing touch data a touch sampling rate and having a sampling sync, and
(b) a display system that displays frames at a refresh rate having a refresh sync, the method comprising:
commencing sampling of touch sensor output on a sampling sync and placing sampled output in a sampling buffer at a sampling rate;
commencing frame rendering to one of a plurality of display buffers on a refresh sync;
displaying on a touch screen display images corresponding to a rendered frame on a refresh sync;
determining a period of time T1 corresponding to an estimated time for collecting the output in the sampling buffer;
determining a period of time T2 corresponding to an estimated time for computing touch event data from collected output;
determining a period of time T3 corresponding to an estimated time for rendering of a frame corresponding to the touch event data;
computing a start time based upon the refresh sync, T1, T2 and T3; and
initiating collecting the output in the sampling buffer at the start time; and thereafter computing touch event data from collected output and rendering of a frame corresponding to the touch event data.

15. The method of claim 14, wherein the step of determining a period of time Tc comprises measuring a period of time previously required for sampling touch data from the touch sensing system.

16. The method of claim 14, wherein the step of determining a period of time Tm comprises measuring a period of time previously required for computing touch event data from sampled touch data.

17. The method of claim 14, wherein the step of determining a period of time Tr comprises measuring a period of time previously required for rendering a previous frame to the frame buffer.

18. The method of claim 14, wherein the period of time for rendering of a frame comprises a period of time for completion of rendering of the frame and writing data for the frame to the frame buffer.

19. The method of claim 14, wherein commencement of rendering is delayed until a time which allows rendering to be completed and the rendered output ready in a predetermined period of time prior to the display system refresh.

20. A method for reducing latency between an acquisition of touch data and processing of an associated rendering task in a touch sensitive device having a touch sensing system capable of producing touch data a touch sampling rate and a display system that displays frames at a refresh rate, the frames reflecting input to the touch sensing system, the method comprising:
estimating at least one of (a) a period of time for sampling touch data from the touch sensing system, (b) a period of time for computing touch event data from sampled touch data, and (c) a period of time for rendering of a frame to a frame buffer;
determining a period of time Tc for (a) sampling touch data from the touch sensing system, (b) computing touch event data from sampled touch data, and (c) rendering of a frame to a frame buffer, based at least in part on the estimate;
determining a point in time Tr at which the display system will be refreshed from the frame buffer;
computing a sampling start time based upon Tr and Tc;
initiating the sampling of the touch sensing system to obtain sampled touch data at the sampling start time;
computing touch event data from the sampled touch data; and
rendering a frame reflecting the touch event data to the frame buffer prior to the time Tr.

* * * * *